Figure 1:
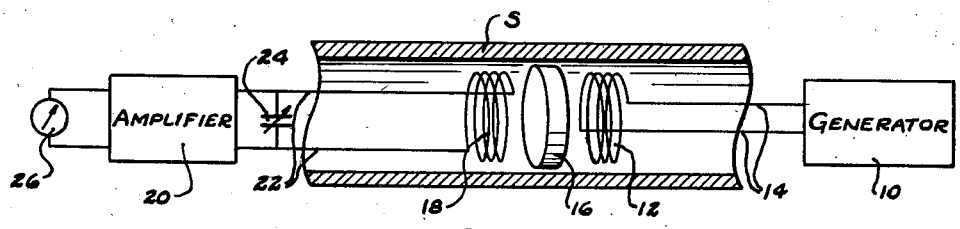

April 23, 1957   J. C. BENDER   2,790,140
METHOD OF AND MEANS FOR TESTING FERROUS MATERIAL
Filed Oct. 3, 1951

INVENTOR.
JOHN C. BENDER
BY James F. Weiler

United States Patent Office 2,790,140
Patented Apr. 23, 1957

2,790,140

METHOD OF AND MEANS FOR TESTING FERROUS MATERIAL

John Carlos Bender, Bellaire, Tex., assignor to Houston Oil Field Material Company, Inc., Houston, Tex., a corporation of Delaware Application October 3, 1951, Serial No. 249,492

13 Claims. (Cl. 324—37)

This invention relates generally to electrical testing of metal articles for defects and flaws and more particularly to improved methods of and means for detecting and locating flaws or defects in metal articles such as pipe, tubing, rods and the like.

It is a general object of the present invention to provide a means for and a method of electrically detecting anomalies in magnetizable specimens, which anomalies may be physical defects in the specimens themselves or external conditions affecting such specimens.

It is a particular object to provide such a means and method in which a strong signal or indication of the anomalies is provided thereby providing reliable and accurate results.

It is yet a further object of the present invention to provide a means of and a method for electrically detecting anomalies in magnetizable specimens in which a radiated wave is transmitted through the specimen and inductively observed to indicate the location and extent of such anomalies.

The present invention includes the steps of causing radiated waves to be transmitted through the specimen itself and inductively observing variations in the waves so transmitted due to changes in permeability in the specimen. The changes in permeability of the specimens may be due to flaws, defects, inhomogeneities in the specimens or external conditions affecting the specimens. The specimens may be stressed to provide strain therein and may be subjected to a magnetic field or a combination thereof. Surprisingly, the signal indicating anomalies in the specimens is strengthened and a more positive and hence more accurate indication is given in the detector circuit when the specimens are magnetized or are subjected to strain or a combination thereof. The method of testing utilizing strain and a magnetic field is described and claimed in my copending application, Serial No. 249,491, filed October 3, 1951.

Many variations may be made in the method and apparatus described briefly above. In general it is only necessary to transmit the radiated wave in the specimen itself and to inductively observe variations in the transmitted wave caused by anomalies in the specimen. For example, the pulsating wave may be radiated at right angles to the specimen and received, after transmission in the specimen, at right angles thereto. Such may be the case with respect to either the longitudinal or transverse axis or axes of the specimen. In such instances an impermeable barrier or shield is utilized to prevent direct inductance of the radiated wave without transmission of such wave through the portion of the specimen then being tested. A similar result is obtained, however, by positioning the radiating coil and the receiving coil at right angles to one another in which event the impermeable barrier or shield is unnecessary and the radiated wave is received from the specimen through which it is transmitted inasmuch as the radiating coil and the receiving coils are at a phase angle of 90 degrees. As stated heretofore, the specimen may be subjected to a strain or a magnetic field or both. It is not necessary to completely saturate the specimen as it has been found that even a weak magnetic field surprisingly increases the signal obtained from anomalies.

The foregoing and other variations will be described in more detail hereinafter.

Various features and advantages of the present invention will be apparent from the following detailed description of examples of the invention, given for the purpose of disclosure, in connection with the accompanying drawing, in which like character references refer to like parts throughout the several views and in which—

Figures 2, 3:
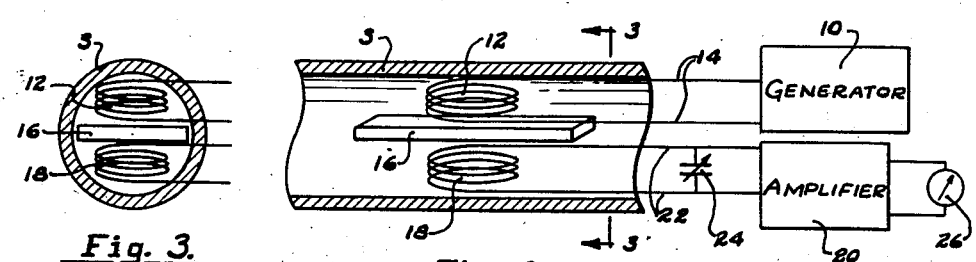
Figure 4:
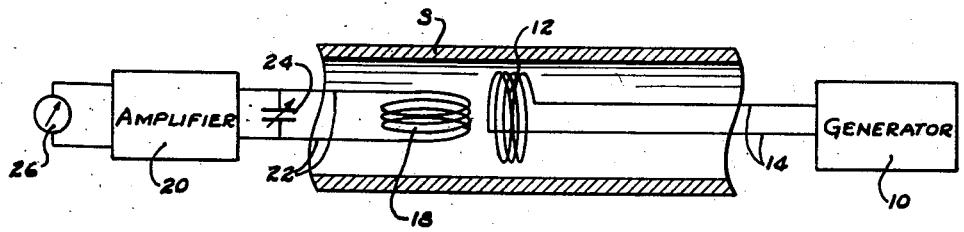

Fig. 1 illustrates diagrammatically a simplified form of apparatus in accordance with the invention for testing specimens for anomalies therein, the illustrated specimen being a tube shown in section, Fig. 2 illustrates diagrammatically a modification of the apparatus illustrated in Fig. 1, Fig. 3 is a cross-sectional view taken along the line 3—3 of Fig. 2, and Fig. 4 diagrammatically illustrates a still further modification of apparatus constructed in accordance with the invention.

Referring now to the drawing and particularly to Fig. 1 a specimen S is illustrated as a tube or pipe. A conventional generator 10, preferably an oscillator of the ratio frequency type, is connected to the coil or probe 12 by means of the electrical conductors 14 and provides an alternating or pulsating current in the coil 12. An impermeable barrier or shield 16 formed of any suitable material, such as copper, is provided adjacent the coil 12 and snugly against the surface of the specimen 5 and functions to prevent the passage of radiated waves to the inductance or receiving coil 18 without first passing through the specimen S.

The inductance 18 is electrically connected to the amplifier 20 by means of the electrical conductors 22 which have the variable condenser 24 connected thereacross. A conventional indicating means 26 is electrically connected to the amplifier 20 to give an indication of anomalies in the specimen S.

The operation of the apparatus of Fig. 1 is as follows: Alternating or radio frequency current is caused to flow circumferentially in the specimen S by induction from the current flowing in the radiating coil or conductor 12 from the generator 10. The impermeable barrier 16 prevents the direct inductance of the radiated waves, it being necessary that the radiated waves flow in the specimen S beyond the barrier to be inducted in the receiver coil 18. The detector circuit is maintained at resonance with the conductor circuit and the radiated waves after transmission in the specimen S beyond the barrier 16 induce an E. M. F. in the detector circuit and such induced E. M. F. is varied when an anomaly is present in that portion of the specimen S through which the radiated wave flows.

The variation of the induced E. M. F. changes the frequency of the detector circuit thereby bringing it out of resonance and indicating such anomaly. This variation may be amplified in the amplifier 20 and observed by means of the indicator 26. Thus, anomalies of the specimen affect the resonance of the conductor and detector circuits by varying the radiated waves transmitted through that portion of the specimen being tested thereby giving an indication of such anomalies.

Figs. 2 and 3 illustrate a slight modification of the apparatus shown in Fig. 1 in that the coils 12 and 18 and the shield are positioned at an angle of 90 degrees to that illustrated in Fig. 1. Thus, the longitudinal axis of these elements are substantially parallel to axis of the pipe being tested. Thus there is no inductance of the radiated waves into the detector coil 18. Other than this slight change, the operation and form of the apparatus of Figs. 2 and 3 are identical to that of Fig. 1.

Fig. 4 represents a still further modification of the apparatus illustrated in Figs. 1 and 2 in that the inductance or coil 18 of the detector circuit is positioned at right angles to the conductor coil 12. Inasmuch as there is a ninety degree phase angle between the conductor and inductor coils, it is not necessary to provide an impermeable barrier or shield. The operation of this modification is similar to the examples illustrated in Figs. 1 and 2; however, the waves are radiated circumferentially and transmitted through the portion of the specimen being immediately tested and received axially in the inductance 18. Otherwise, the method of operation and the apparatus are identical. The conductor and detector coils may be positioned in any desired manner with respect to the specimens; however, a phase angle of 90 degrees therebetween should be maintained in the event a shield is not used.

In all the examples illustrated above successive small portions of the specimen being tested are inductively coupled into the apparatus and either the apparatus or the specimen may be moved as desired. In testing pipe in oil wells and the like, obviously the apparatus will be contained in a suitable housing and may be lowered into a well bore in the usual manner. In addition, the specimen may be magnetized, either saturated or merely subjected to a weak magnetic field and the specimen may be subjected to strain. All these factors are determinable and may be determined in advance in order to produce reliable and accurate results of anomalies and the position thereof in the specimen under test.

The present invention is particularly adapted for use in testing pipe or casing in or used in oil wells to determine flaws or anomalies therein and conditions affecting the pipe. A more detailed description of such conditions is set forth in my copending application, above identified.

It is manifest that the present invention is of wide use and may be used to test hollow, cylindrical, irregular or solid objects. In testing solid objects, it is only necessary to dispose the coils and the shield on the outside of the specimen being tested.

Broadly, the present invention comprises apparatus for and a method of testing magnetic specimens in which means are utilized to prevent what may be termed a direct reception of the radiated waves, it being necessary that the radiated waves flow through that portion of the specimen being tested, anomalies in the specimen resulting in an unbalancing of the conductor and amplifier-detector circuits and thereby indicating the presence of flaws, anomalies and the like.

It is manifest that the invention is of wide scope and application and is not to be limited to the precise details given for the purpose of disclosure. Accordingly, the invention is limited only by the spirit thereof and the scope of the appended claims.

What is claimed is:

1. The method of testing electrically conductive cylindrical articles for defects which includes the steps of maintaining a circuit of varying electrical current, causing such varying current to flow from a single source in said circuit circumferentially in successive axial short lengths of such cylindrical articles, inducing such varying circumferential flowing current in such cylindrical articles into a single receiver in a detector circuit in phase with said first mentioned circuit, preventing inductance into said detector circuit of varying current not flowing in said axial short lengths, and locating anomalies in and of said cylindrical articles caused by defect caused changes in the current flowing in the cylindrical article in the immediate vicinity of a defect.

2. The method of testing electrically conductive cylindrical articles for anomalies which include the steps of maintaining a circuit of varying electrical current, causing such varying current to flow from a single source axially in successive axial short lengths of such cylindrical articles, inducing such varying axial flowing current in such cylindrical articles into a single receiver of a detector circuit maintained in phase with said first mentioned circuit, preventing inductance into said detector circuit of varying current not flowing in said axial short lengths, and locating anomalies in and of said cylindrical articles caused by defect caused changes in the current flowing in the cylindrical article in the immediate vicinity of an anomaly.

3. The method of detecting anomalies in specimens comprising, providing a first single coil adjacent said specimens to produce a varying current therein, providing a second single coil adjacent said specimens and coaxial with said first coil to induce said varying current in a test circuit in phase with such varying current, and providing a shield between said first and second coils to prevent flux from being induced by said second coil into said test circuit which does not pass through such specimens.

4. A device for testing for anomalies in or about pipe comprising, a pair of spaced coaxial coils, an energizing circuit supplying one of such coils with variable current, a detector circuit electrically connected to the other of said coils, and shield means adapted for snugly fitting of such pipe and disposed between said coils to prevent leakage of flux from one coil to the other coil without flowing in that portion of said pipe being tested.

5. A device for testing for anomalies in or about pipe comprising, a pair of spaced coaxial coils, an energizing circuit supplying one of such coils with variable current, a detector circuit electrically connected to the other of said coils, shield means adapted for snugly fitting of such pipe and disposed between said coils to prevent leakage of flux from one coil to the other coil without flowing in that portion of said pipe being tested, and means in such detector circuit for indicating anomaly caused variations in the E. M. F. induced in said detector circuit.

6. A device for testing a metallic object comprising, an energizing circuit including a single energizing coil supplied with variable current, a detector circuit including a single detector coil disposed in inductive relationship with said energizing coil, and an impermeable shield disposed between said energizing coil and said detector coil, said energizing coil, shield and detector coil arranged relative to one another for placing generally on the same side of the metallic object when testing, said shield preventing leakage of flux from said energizing coil to said detector coil without first flowing in that portion of said metallic object being tested.

7. A device for testing a metallic object comprising, an energizing circuit including a single energizing coil supplied with variable current, a detector circuit including a single detector coil disposed in inductive relationship with said energizing coil, an impermeable shield disposed between said energizing coil and said detector coil, said energizing coil, shield and detector coil arranged relative to one another for placing generally on the same side of the metallic object when testing, said shield preventing leakage of flux from said energizing coil to said detector coil without first flowing in that portion of said metallic object being tested, and means in said detector circuit for indicating anomaly-caused variations in the E. M. F. induced in said detector coil.

8. A device for testing a metallic object comprising, a pair of spaced coils having their axes parallel to one another, an energizing circuit supplying one of said coils with variable current, a detector circuit electrically connected to the other of said coils, and an impermeable shield disposed between said coils to prevent leakage of flux from said one coil to the other coil without flowing in that portion of the pipe being tested, said coils and said shield being arranged relative to one another to be placed generally on the same side of said portion when testing.

9. A device for testing a metallic object comprising, a pair of spaced coils having their axes parallel to one another, an energizing circuit supplying one of said coils with variable current, a detector circuit electrically connected to the other of said coils, an impermeable shield disposed between said coils to prevent leakage of flux from said one coil to the other coil without flowing in that portion of the metallic object being tested, said coils and said shield being arranged relative to one another to be placed generally on the same side of said portion when testing, and means in the detector circuit for indicating anomaly-caused variations in the E. M. F. induced in said detector circuit.

10. A method of detecting anomalies in a metal specimen comprising, providing alternating fluxes in a primary circuit including a single energizing coil, providing a secondary circuit including a single detector coil, arranging said coils in inductive relationship to and on the same side adjacent a small portion of the specimen with their axes parallel to each other, providing a shield between said coils on said same side and adjacent said small portion thereby causing said fluxes to flow from said single energizing coil, in said small portion and being induced into said single detector coil and thereby into said secondary circuit, and instrumentally observing variations in said second circuit caused by anomalies in said specimens.

11. A method of detecting anomalies in a metal specimen comprising, maintaining a radio-frequency circuit including a single energizing coil, maintaining a detector circuit in phase with said radio-frequency circuit, said detector circuit including a single detector coil, disposing said coils in inductive relationship to and on the same side adjacent a small portion of the specimen with their axes parallel to each other, providing a shield between said coils on said same side and adjacent said small portion, causing relative movement between said specimen and said coils and shield thereby successively electromagnetically coupling different small portions of said specimen with said radio-frequency circuit thereby producing eddy currents therein and inducing said eddy currents from said small portions into said single detecting coil, and instrumentally observing variations in said detector circuit caused by said anomalies in said specimen.

12. A method of detecting anomalies in a metal specimen comprising, maintaining a radio-frequency circuit including a single energizing coil, maintaining a detector circuit in phase with said radio-frequency circuit, said detector circuit including a single detector coil, disposing said coils in coaxial relationship to one another adjacent and on the same side of a small portion of said specimen, disposing a shield between said coils on said same side and adjacent to said small portion, causing relative movement between said specimen and said coils and shield thereby successively electromagnetically coupling different small portions of said specimen with said radio-frequency circuit thereby producing eddy currents therein and inducing said eddy currents from said small portions into said single detecting coil, and instrumentally observing variations in said detector circuit caused by said anomalies in said specimen.

13. A method of detecting anomalies in a magnetizable specimen comprising, maintaining an oscillatory circuit including a single energizing coil, maintaining a detector circuit in phase with said oscillatory circuit, said detector circuit including a single detector coil, disposing said coils in coaxial relationship to one another on the same side and adjacent a small portion of said magnetizable specimen, disposing a shield between said coils on said same side and adjacent to said small portion, causing relative movement between said specimen and said coils and shield thereby successively electromagnetically coupling different small portions of said specimen with said oscillatory circuit thereby producing eddy currents therein and inducing said eddy currents from said small portions into said single detecting coil, and instrumentally observing variations in said detector circuit caused by said anomalies in said specimens.

References Cited in the file of this patent

UNITED STATES PATENTS

| Re. 15,859 | Burrows | June 17, 1924 |
| 1,129,584 | Murphy | Feb. 23, 1915 |
| 2,057,835 | Karajam et al. | Oct. 20, 1936 |
| 2,065,119 | Davis | Dec. 22, 1936 |
| 2,237,254 | Broekhuysen | Apr. 1, 1941 |
| 2,353,211 | Zuschlag | July 11, 1944 |
| 2,489,920 | Michel | Nov. 29, 1949 |
| 2,511,233 | Anderson | June 13, 1950 |